United States Patent [19]

Kahn

[11] 4,326,798

[45] Apr. 27, 1982

[54] PYROMETER SYSTEM USING SEPARATED SPECTRAL COMPONENTS FROM A HEAT SOURCE

[75] Inventor: David A. Kahn, Southampton, England

[73] Assignee: Negretti & Zambra (Aviation) Limited, Hampshire, England

[21] Appl. No.: 33,252

[22] Filed: Apr. 25, 1979

[30] Foreign Application Priority Data

Apr. 26, 1978 [GB] United Kingdom ............... 16628/78

[51] Int. Cl.³ ............................. G01J 5/18; G01J 5/24
[52] U.S. Cl. ................................... 356/45; 73/355 R; 356/43
[58] Field of Search ............................ 356/43, 44, 45; 73/355 R, 356

[56] References Cited

U.S. PATENT DOCUMENTS 3,454,769  7/1969  Dynes ................................... 356/45
4,222,663  9/1980  Gebhart et al. ........................ 356/45
4,227,369 10/1980  Williams ............................ 73/355 R

FOREIGN PATENT DOCUMENTS 568851 12/1977 U.S.S.R. ................................ 356/43

*Primary Examiner*—Vincent P. McGraw
*Attorney, Agent, or Firm*—Sherman & Shalloway

[57] ABSTRACT

A pyrometer system for the measurement of the temperature of a primary source of heat which might be contaminated by radiation from a transient spurious source of heat at a higher temperature, and in which the presence of radiation from the spurious source can be detected or identified by spectral discrimination. The received radiation is separated into two spectral components of which a second component comprises a significantly higher proportion of radiation emitted by the spurious source than does the first component. The ratio of, or the difference between, the magnitudes of the radiation in the second and first components is used to identify or detect the presence of spurious radiation and to produce an error, or flag, signal which is used to inhibit operation of the pyrometer or to cause it to hold the last received 'good' reading before the occurrence of the spurious radiation.

6 Claims, 7 Drawing Figures

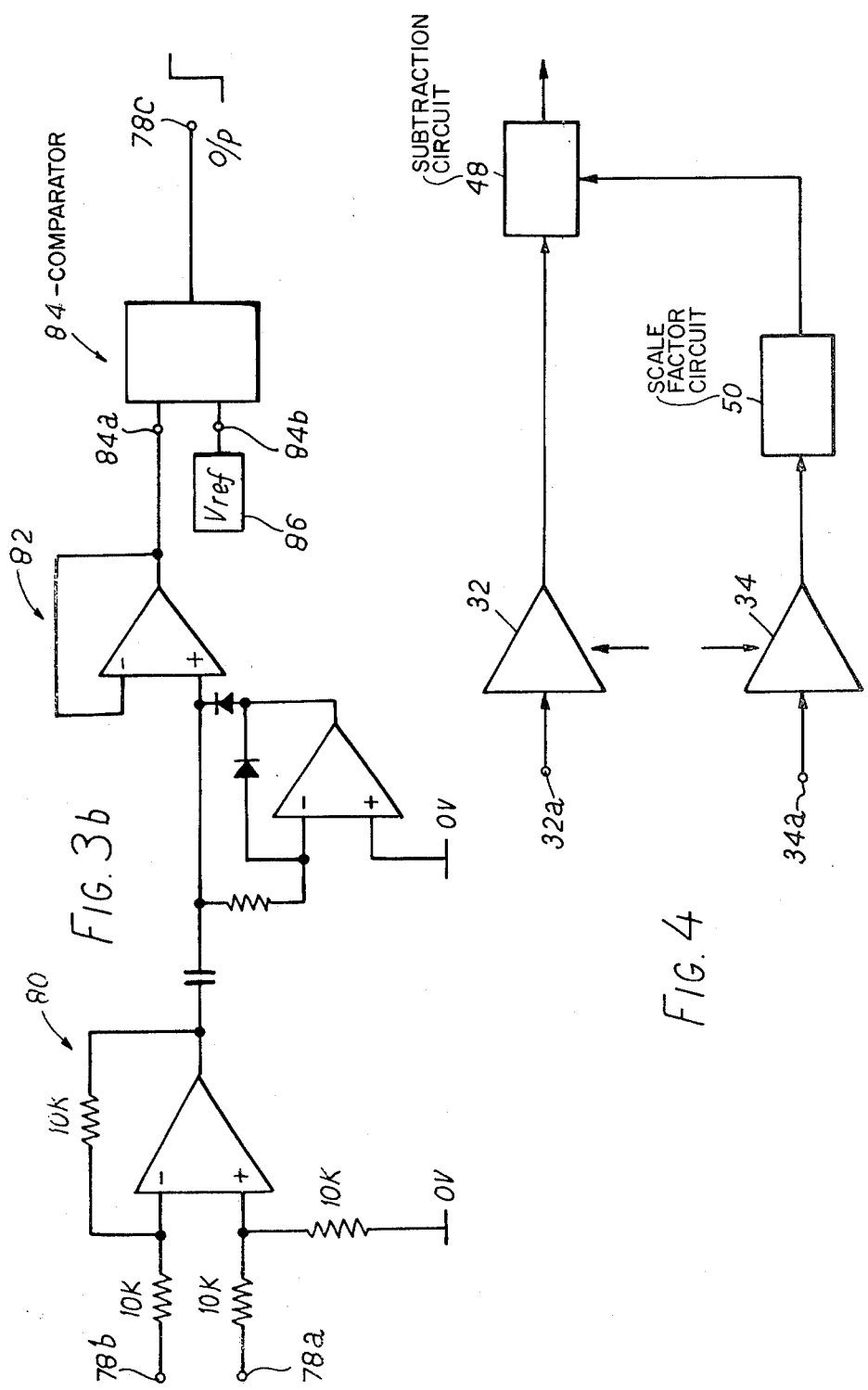

PYROMETER SYSTEM USING SEPARATED SPECTRAL COMPONENTS FROM A HEAT SOURCE

BACKGROUND OF THE INVENTION

This invention relates to pyrometers.

DISCUSSION OF THE PRIOR ART

It has been found that in some applications, temperature measurement of a primary source of heat can be subject to error due to the presence of spurious sources of heat at a much higher temperature. The turbine blade pyrometer permits the surface temperature of a turbine blade to be estimated by measurement of the emitted black body radiation flux. Unfortunately, the measurement can be degraded by the transitory presence of hot carbon particles from the combustion chamber which gives rise to large "pulses" of radiation which, without identification, could lead to unduly high estimations of the turbine temperature. The hot carbon particles have a temperature considerably in excess of that of the turbine-blade surface. Consequently, the spectral distribution of the emitted radiation will be different, in particular, a greater proportion of the energy will be in the shorter wavelengths such as are associated with the visible region of the spectrum.

SUMMARY OF THE INVENTION

According to the invention, errors in the measurement of the temperature of a primary source due to the presence of radiation from spurious objects can be detected or identified by spectral discrimination, that is by separating the radiation into at least two spectral components of which a second component comprises a significantly higher proportion of the radiation emitted by the spurious source than does the first component whereby a characteristic of the second component can be used to detect or identify the presence of radiation from the spurious source of heat. The said characteristic may be the magnitude of the radiation and the ratio of, or the difference between, the magnitudes of the said first and second spectral components can be used to detect or identify the presence of radiation from a spurious object.

Preferably, means, such as a dichroic filter, prism or grating is provided from separating the radiation into at least two spectral components.

According to the invention, there is provided a pyrometer system for determining the temperature of a primary source of heat in the presence of a transient spurious source of heat at a substantially different temperature from that of the primary source, the system comprising means for receiving radiation from the primary and spurious sources of heat, said radiation having predominant wavelengths dependent upon the temperature of the primary and spurious sources respectively, means for separating the radiation into at least two spectral components of which both spectral components comprise a substantial proportion of the radiation of wavelength emitted by the primary source and a second spectral component comprises a significantly higher proportion of the radiation emitted by the spurious source than does the first component and means for coupling the said first spectral component of radiation to a pyrometer whereby the temperature of the primary source can be determined.

The pyrometer system may comprise means for coupling the said second spectral component of radiation to means responsive to the magnitude of the radiation and arranged to modify operation of the pyrometer in dependence upon the said magnitude.

The means responsive to the magnitude of the said second spectral component of radiation may be arranged to inhibit operation of the pyrometer when the said magnitude is equal to or greater than a predetermined value, or a predetermined proportion of the magnitude of the said first spectral component of radiation.

The means responsive to the said magnitude of the said second spectral component of radiation may be arranged to provide a compensating signal to reduce errors in the determined temperature value of the primary source due to the heat of the spurious source.

The compensating signal may be arranged continuously to reduce the said errors in the determined temperature value.

The means for separating the radiation into two spectral components may be a dichroic beam-splitting device, a prism or a grating.

DESCRIPTION OF THE DRAWINGS

The invention will now be described by way of example with reference to the accompanying drawings in which:

FIG. 3b is a diagram of part of the circuit of FIG. 3a, FIG. 4 is a block circuit diagram of part of a fifth embodiment of a pyrometer system for use with FIG. 1.

DETAILED DESCRIPTION OF THE INVENTION

Figure 1:
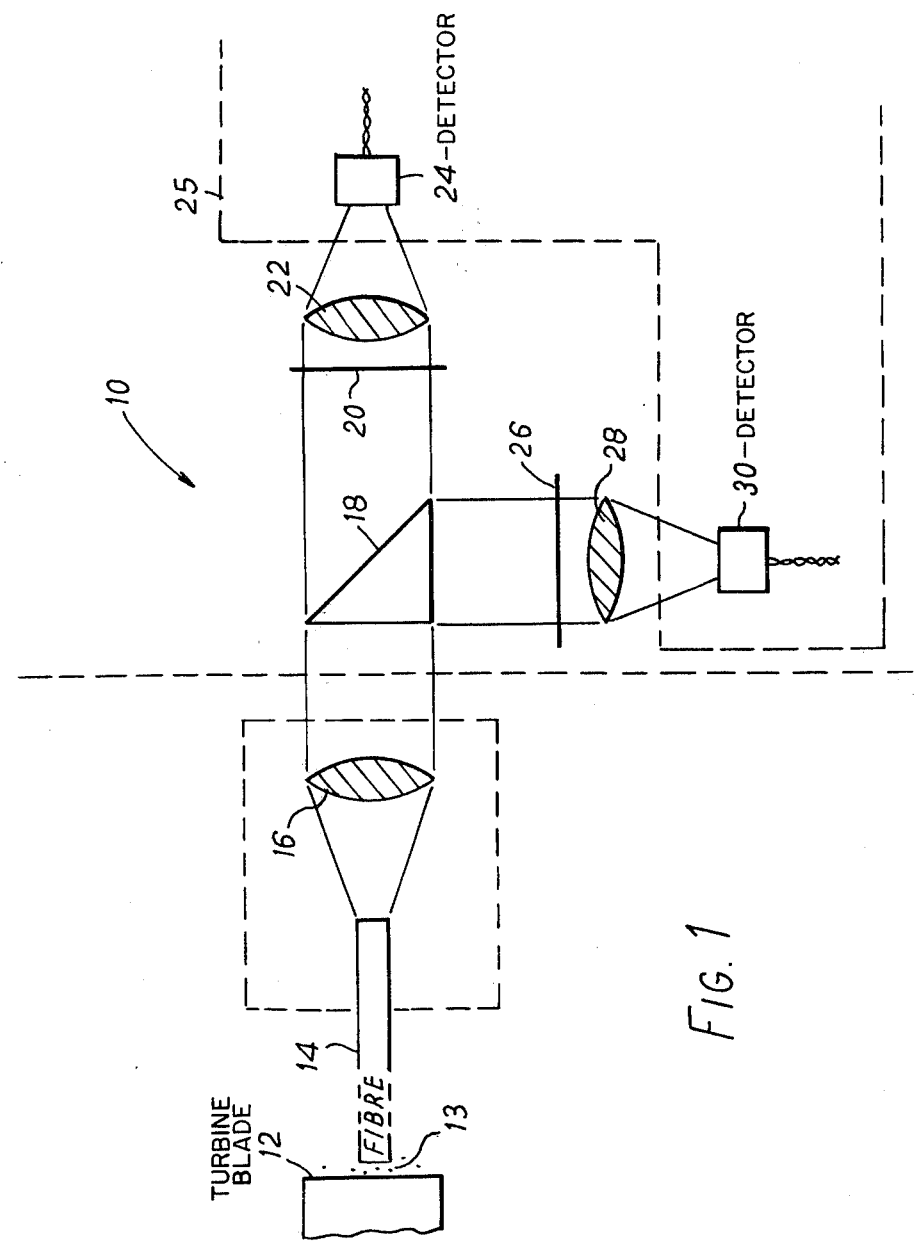
FIG. 1 is a schematic diagram of part of a pyrometer system according to the invention.

In the drawings, like parts are given like references.

Referring to FIG. 1 there is shown part of a pyrometer system 10 for determining the temperature of a turbine blade, shown schematically at 12. The radiation from the turbine blade 12 can be contaminated by transient radiation emitted by carbon particles 13 at a much higher temperature than the blade. Radiation from the blade 12 and carbon particles 13 is coupled by way of a glass fibre optical waveguide 14 and lens 16 to a dichroic beam-splitting device 18. The radiation emitted by the carbon particles 13 being at a much higher temperature than the blade 12 will have a significant proportion of its energy at a shorter wavelength than that emitted by the turbine blade. Typically the pyrometer is arranged to respond to radiation emitted by the blade 12 having a wavelength in a range of approximately 0.8 to 1 $\mu$m although the radiation emitted by the blade 12 will probably have a wider range, up to say 5 $\mu$m or more. The radiation emitted by the carbon particles will also include components having a wavelength in the range 0.8 to 1 $\mu$m but it will also include significant components at a shorter wave length. The beam-splitting device 18 is arranged to split the radiation received from the direction of the source 12 into two spectral components, that is a first component having a wave length equal to or greater than 0.8 μm and a second component having a wavelength less than 0.8 μm. The first component is coupled by way of a signal channel comprising a filter 20 and lens 22 to a photodetector 24 of a pyrometer system 25, the output of the photodetector 24 being amplified and processed in the pyrometer system 25 to produce an indication of the temperature of the turbine blade 12. The second spectral component is coupled by way of an error channel comprising a filter 26 and lens 28 to a second photodetector 30.

The filter 20 is arranged to substantially reduce or eliminate radiation at a wave length less than 0.8 μm and similarly, the filter 26 is arranged to substantially reduce or eliminate radiation at a wave length equal to or greater than 0.8 μm.

In an ideal situation, that is in the absence of any hot carbon particles, and for a given temperature of the blade 12, the magnitude of the radiation detected by detector 30, to generate an "error channel" photo current, would be much less than that detected by detector 24, to generate a "signal channel" photo current. Typically, in the absence of a hot carbon particle, the "error channel" current would be about 1% to 16% of the "signal channel" current depending upon the temperature of the turbine blade 12. In the presence of a hot particle, typically at 1200° C., the "error channel" current could rise significantly, for example up to about 44% of the signal current.

The pyrometer system 25 in its simple form could be arranged to determine the ratio of the error and signal channel currents and if the proportion of the error channel current is greater than a predetermined value, say 16%, means could be provided for inhibiting the temperature measurement or otherwise indicating that the measurement may be in error.

Thus the output from the short wavelength error channel could be used to validate or conversely to suppress the output from the long wavelength signal channel from which the blade temperature is deduced. FIGS. 1a to c show three embodiments of apparatus of such a system.

Figure 2A:
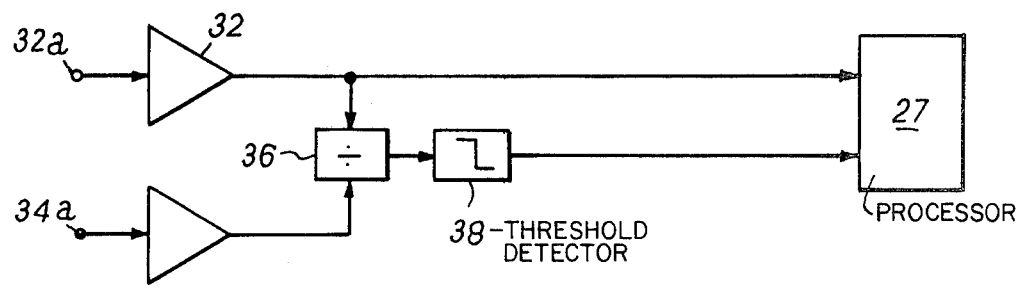
FIG. 2a is a block circuit diagram of part of one embodiment of a pyrometer system for use with FIG. 1.

Referring to FIGS. 1 and 2a, the output signals from the photodetectors 24 and 30 are coupled to the inputs 32a, 34a of two pre-amplifiers 32 and 34 respectively of the pyrometer system 25. The output of the amplifier 32 is processed by the pyrometer system to provide an indication of temperature and is also coupled to one input of a divider circuit 36. The output of the amplifier 34 is coupled to the other input of the divider circuit 36. The output of the divider circuit 36, which is equal to the ratio of the magnitudes of the error and signal currents, is coupled to a threshold detector circuit 38 which is arranged to provide a "flag" output signal to the pyrometer system if the ratio exceeds a predetermined value to indicate an erroneous temperature reading due to the presence of hot carbon particles.

Figure 2B:
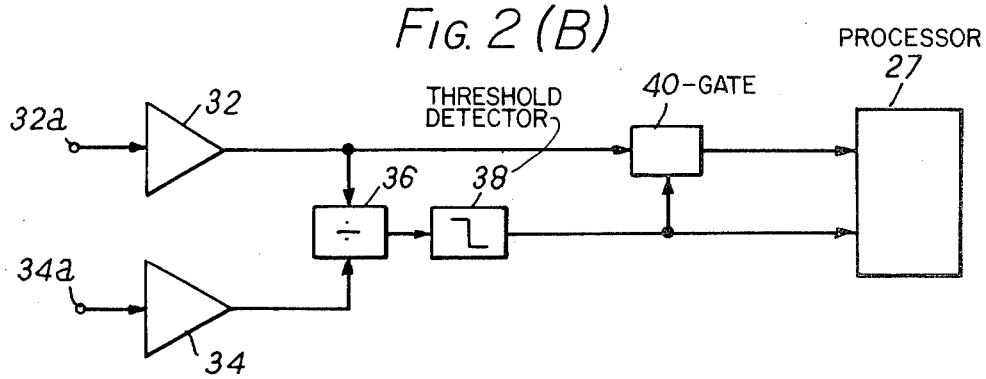
FIG. 2b is a block circuit diagram of part of a second embodiment of a pyrometer system for use with FIG. 1.

Referring to FIG. 2b, there is shown a circuit similar to that of FIG. 2a but in this circuit the output of the signal current amplifier 32 is coupled through a gate 40 to be processed by the pyrometer system and the output from the threshold detector 38 is coupled to a control input of the gate 40 so that a measurement is suppressed by the flag signal when the said ratio exceeds a predetermined value to close the gate 40.

Figure 2C:
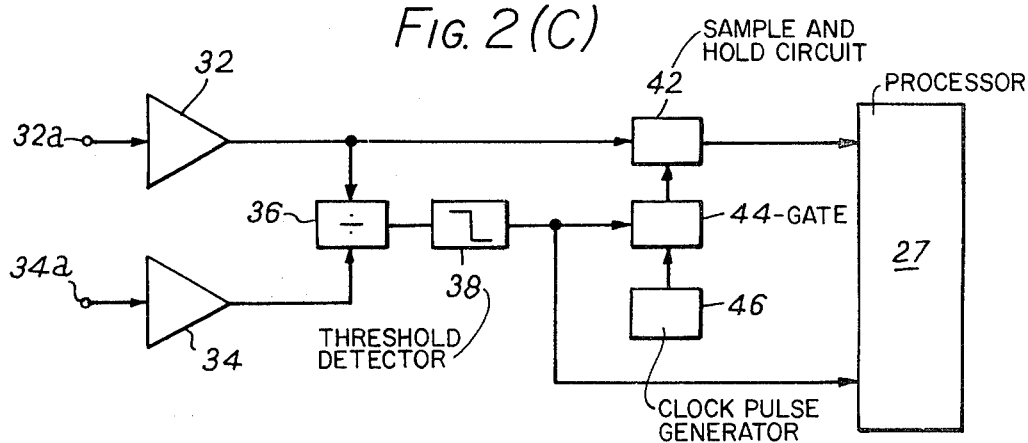
FIG. 2c is a block circuit diagram of part of a third embodiment of a pyrometer system for use with FIG. 1.

FIG. 2c is again similar to FIG. 2a, with the exception that the output of amplifier 32 is coupled to the pyrometer processor 27 by way of a high-speed sample and hold circuit 42 which is strobed by a clock signal coupled by way of a gate circuit 44 from a clock pulse generator 46. The gate 44 is controlled by the output from the threshold detector 38. When the threshold detector 38 indicates an erroneous measurement, the gate 44 is closed and the processor 27 is supplied from the sample and hold circuit 42 with the last obtained "good" signal. In this case the "flag" signal indicates that the indicated temperature reading is a stored rather than a current reading.

Linear preamplifiers are shown in the FIG. 2. However these are not essential and logarithmic preamplifiers may be used. In this case, the ratio can be obtained by simple subtraction as $$\log A - \log B = \log (A/B)$$

There are many other ways of obtaining the ratio. These include analogue means such as logarithmic modules and integrated dividers, and digital means involving analogue to digital conversion and subsequent computing using hard wired logic or microprocessors.

Furthermore, although the embodiment described in FIG. 1 includes a dichroic beam splitter, or filter, 18 which is arranged to split the radiation into two components, one equal to or greater than 0.8 μm and the other less than 0.8 μm, it is possible to split the radiation at other wavelengths. If the partition wavelength is made about 0.95 μm then the magnitudes of the radiation due to the source in the longer wavelength, "signal" channel and in the shorter wavelength, "error" channel will be about equal but the instantaneous magnitudes of the radiation due to a spurious source, such as a hot carbon particle, will be greater in the shorter wavelength channel.

In a development of the invention, it may be possible to compensate the signal channel continuously for errors which can be determined from the error channel and arising from spurious heat sources such as hot carbon particles. The ratio of the powers in each channel generated by a hot surface in isolation is constant for a particular temperature and this is, of course, the basis of the well known technique of two colour pyrometry from which this invention is distinguished by the fact that the former is simply a technique for temperature estimation whereas the present invention is concerned with a technique for reducing or eliminating the effects on temperature estimation of a primary source such as a turbine blade from corruption by radiation from a spurious source, such as hot carbon particles. The compensation process can comprise subtracting a fixed proportion or multiple of the magnitude of the radiation in the short wave error channel from that of the signal channel in an electronic circuit.

FIG. 3 shows a further embodiment of a system according to the invention wherein the dichroic filter is used to split the radiation received from a source into two spectral components having approximately equal magnitudes in the absence of a spurious source of heat.

Figure 3A:
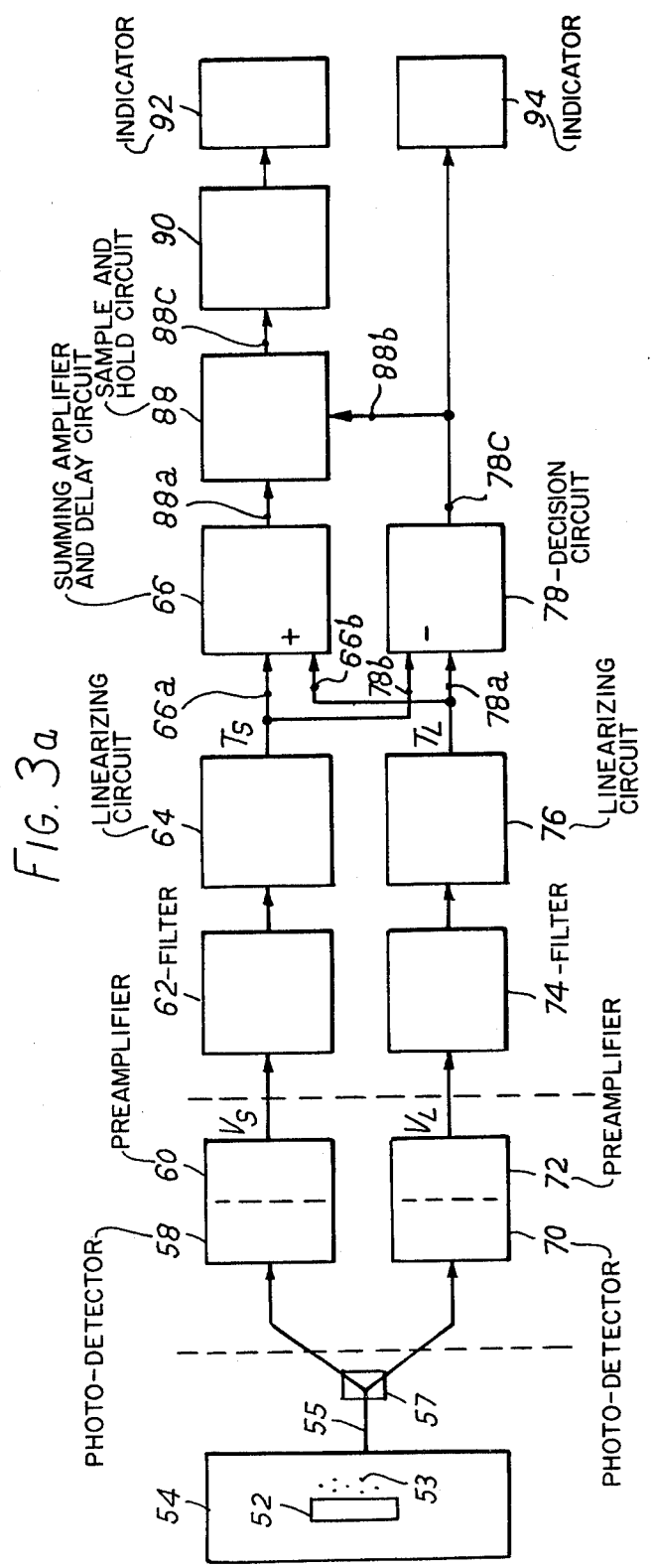
FIG. 3a is a block circuit diagram of part of a fourth embodiment of a pyrometer system.

Referring to FIG. 3a there is shown a pyrometer system 51 for determining the temperature of a turbine blade shown schematically at 52 in an engine 54. As described with reference to FIG. 1, the radiation from the blade 52 can be contaminated by transient radiation emitted by carbon particles 53 at a much higher temperature than the turbine blade 52. Radiation from the blade 52 and from the transient carbon particles 53 is coupled by way of an optical waveguide and lens system 55 to a dichroic beam-splitting device, or filter, 57 arranged to split the radiation received from the waveguide 55 into two spectral components, that is a first component having a wavelength equal to or greater than about 0.95 μm and a second component having a wavelength less than about 0.95 μm.

The first component is coupled by way of a primary channel comprising a photodetector 58, preamplifier 60, filter 62 and a linearising circuit 64 to one input 66a of a summing amplifier and delay circuit 66.

Similarly the second component is coupled by way of a secondary channel comprising a photodetector 70, preamplifier 72, filter 74 and a linearising circuit 76 to one input 66b of the summing amplifier and delay circuit 66 and to one input 78a of a decision circuit 78. The output from lineariser 64 in the primary channel is coupled to the other, substract input 78b of the decision circuit 78. A circuit diagram of the decision circuit 78 is shown in FIG. 3b and it will be seen that it comprises an operational amplifier 80 arranged as a subtractor circuit having minuend and subtrahend inputs 78a and 78b respectively. The output of the circuit 80 is coupled through an auto-reference, or d.c. restorer circuit 82 to one input 84a of a comparator circuit 84, the other input 84b of which is coupled to a source of a reference voltage 86. The auto-reference circuit 82 is well known and would provide an output signal of the form A+A sin ωt if an input signal of the form A sin ωt were applied to it for example.

The magnitudes of the signals appearing at the output of the linearisers 64 and 76 will be dependent upon the temperature of the turbine blade 52 and under ideal conditions in the absence of spurious sources of heat, they should be about equal. Thus either output could be applied to a pryometer to determine the temperature of the blade. However, in the presence of a spurious source of heat, such as hot carbon particles, the magnitudes of the output signals from the linearisers 64 and 76 would increase which would, in turn, introduce errors into the measurement made by the pyrometer, but the latter, being of shorter wavelength, would be affected to a greater degree than the former. For example, if the temperature of the turbine blade 52 is 850° C. and that of the hot particles 1200° C. and if the particles obscure 0.1% of the "target" area of the blade 52 exposed to the waveguide 55 then with a single channel system this would cause an error of 2.1° C. in the temperature determined by the pyrometer. If the partition wavelength is 0.95 μm, the short wave, secondary channel would show an increase of 3.2% whilst the other, primary channel would show an increase of only 2.0%. This would, in turn, cause errors of 2.48° C. and 1.76° C. respectively.

Thus there would be an inter-channel discrepancy of 0.72° C. for a 0.1% obscuration of the blade 52 or 7.2° C. for each 1% obscuration of the blade 52 by particles 53 at a temperature of 1200° C.

Referring again to FIG. 3a, the outputs of the linearisers 64 and 76 are coupled to the summing amplifier and delay circuit 66 and the output of the circuit 66, which is made equal to the mean of the magnitudes of the signals applied to its inputs 64a and 64b but delayed slightly in time, is applied to the input 88a of a sample and hold circuit 88. The output 88c of the circuit 88 is linearly proportional to the temperature of the turbine blade 52 and is coupled by way of circuit 90 to an indicator 92 so that the temperature of the blade is displayed on the indicator 92.

The output signals of the lineariser ciruits 64, 76 are also applied to the decision circuit 78, which first obtains the difference between the magnitudes of the two signals. The difference signal is then passed through the autoreferencing circuit 82 which removes the minimum static discrepancy between the two signals and finally to the threshold, or comparator, circuit 84 which generates a flag output signal if the discrepancy between the two signals is greater than a predetermined value, determined by the magnitude of the reference voltage 86, to indicate the presence of interference due to hot particles. The duration of the flag signal is so arranged that it commences just before the arrival of the delayed signal at the input of the sample and hold circuit 80 and terminates at a discrete interval after the occurence of the particle interference.

The flag signal is applied to the "hold" input 88b of the circuit 88 to hold the signal at output 88c at its value immediately prior to the start of the interference by a spurious source of heat. The flag signal is also coupled to an indicator 94, which indicates the presence of a spurious source of heat and that the reading displayed on the indicator 92 is the most recent "good" value stored in the sample and hold circuit 88. When the spurious source has passed out of the target area, the sample and hold circuit 88 reverts to its sample, or tracking mode of operation.

In practice there will be discrepancies between the two channels owing to imperfections in various parts of the system and these could set the lower limit to the above mentioned threshold level. However, because the disturbance always has the same sign, that is, the interference is always from a hot particle, the auto-referencing circuit 82 can be employed to track the minimum discrepancy level. In this way, static errors between the channels are made irrelevant and only the dynamic errors resulting from gain mis-matching limit the lower threshold setting. For low levels of interference, if the temperature of the particles is sufficiently restricted in range, it should be possible to correct the apparent temperature and thus maintain viewing even in the presence of interference. However, if these conditions are not met, it is better to use the gated track and hold system which, in the absence of interference, propagates the temperature signal normally, but in the presence of interference, holds the last "good" value.

The availability of the two spectral channels enables other parameters of the system to be monitored and possibly permits further corrections with respect to certain sources of error.

In particular, the static discrepancy in temperature estimation between the two channels is a measure of either, or both, the surface emissivity of the blades and the cleanliness of the optics, both of which may reasonably be expected to change slowly with engine useage time. This discrepancy could also be used to generate a correction to the temperature estimation.

Similarly, if there is a static inter-channel discrepancy caused by reflected radiation from the combustion chamber, it may be possible to apply a correction.

The filters 62, 74 are four pole, low pass, linear filters arranged to restrict noise signals by defining the upper bandwidth limit of the signals passed to the respective linearisers 64 and 76. The linearisers 64, 76 are included to linearise the output curve of the photodetectors 58, 70 respectively against the temperature of the turbine blade.

FIG. 4 shows a simplified block circuit diagram of a circuit in which the error current from amplifier 34 is subtracted continuously from the signal current from amplifier 32 in a subtraction circuit 48. The output from amplifier 34 is coupled to circuit 48 by way of a scale factor circuit 50 by means of which the error current can be scaled as required. The efficiency of this mode of operation is dependent upon the constancy of the anomalous signal characteristics.

While embodiments of the invention have been described using discrete circuit blocks, it would be possible to use a microprocessor system to effect much of the processing digitally, for example, in FIG. 3, the linearisation performed by linearisers 64 and 76 and subsequent operations could be carried out by a suitably programmed microprocessor having the curves of the linearisers stored therein. In this case an analogue to digital converter would be required to convert the analogue signals received from the filters 62, 74 into suitable digital signals and it may be preferably to include sample and hold circuits between the filters 72, 74 and the analogue to digital converter to sample the signals periodically.

I claim:

1. A pyrometer system for determining the temperature of a primary source of heat in an environment which is subject to the presence of a transient spurious source of heat at a substantially different temperature from that of said primary source, said system comprising:

means for receiving radiation from the primary and spurious sources of heat;

means for separating the received radiation into at least two radiation components including a first radiation component extending over a first preselected wavelength range and a second radiation component extending over a second preselected wavelength range whereby in the presence of radiation from said primary and spurious sources the relative proportions of the respective radiations in said first and second wavelength ranges are different from one another;

first detector means responsive to the radiation of said first radiation component for producing a first output signal;

first linearising means connected to receive said first output signal and to provide therefrom a first linear output signal that is representative of the temperature of said primary source in the absence of spurious radiation from said first radiation component;

second detector means responsive to the radiation of said second radiation component for producing a second output signal;

second linearising means connected to receive said second output signal and to provide therefrom a second linear output signal that is representative of the temperature of said primary source in the absence of spurious radiation from said second radiation component;

comparator means connected to receive said first and second linear output signals and to provide an error signal when a difference between said first and second linear output signals exceeds a predetermined magnitude;

a summing circuit for providing an average of said first and second linear output signals as a temperature output signal; and a sample and hold circuit having an input, an output and a control input, said input being connected to receive said temperature output signal, said output being connected to an indication means and said control input being connected to receive said error signal whereby the operation of the sample and hold circuit is inhibited in the presence of said error signal.

2. A pyrometer system according to claim 1, wherein said comparator means comprises:

means for subtracting one of said first and second linear output signals from the other to provide a difference signal;

means for providing a reference signal;

and a comparator circuit arranged to receive said difference and reference signals and to provide said error signal when said difference signal exceeds said reference signal.

3. A pyrometer system according to claim 2, wherein said subtracting means incorporates an auto-referencing circuit for compensating static errors between said first and second linear output signals.

4. A pyrometer system according to claim 1, wherein said means for separating the received radiation into said radiation components is so constructed that said first radiation component comprises radiation of wavelengths below a predetermined cut-off frequency and said second radiation component comprises wavelengths above said predetermined cut-off frequency, and said cut-off frequency is so selected that said first and second radiation components contain approximately equal magnitudes of radiation from said primary source.

5. A pyrometer system according to claim 4, wherein said primary source is a turbine blade and said cut-off frequency is about 0.95 $\mu$m.

6. A pyrometer system as claimed in claim 4 or 5, wherein said means for separating the received radiation comprises a dichroic beam splitting device.

* * * * *